UNITED STATES PATENT OFFICE.

JESSE B. BRAUNSTEIN, OF ALLENTOWN, PENNSYLVANIA.

NITRO-STARCH EXPLOSIVE.

No. 868,760.  Specification of Letters Patent.  Patented Oct. 22, 1907.

Application filed February 18, 1907. Serial No. 358,017.

*To all whom it may concern:*

Be it known that I, JESSE B. BRAUNSTEIN, a citizen of the United States, residing at Allentown, county of Lehigh, and State of Pennsylvania, have invented new and useful Improvements in Nitro-Starch Explosives, of which the following is a specification.

My invention relates in general to the manufacture of nitrated carbo-hydrates for use as explosive bases, and its specific object is to produce for such a purpose a stable and economical nitro-starch.

Nitro-starch is well known to be a powerful explosive, but its commercial use heretofore has been small owing to its instability as ordinarily made, and its high expense when treated by methods heretofore proposed for rendering it stable. I have discovered, however, a treatment which is inexpensive and at the same time results in the satisfactory stability of the resulting explosive base.

It is generally known that one of the chief obstacles to be overcome in obtaining a stable commercial nitro-starch is the difficulty encountered in getting rid of the last traces of free acid due to nitration, and other impurities usually present. Washing the nitro-starch with water alone will not accomplish this. Neither can it be satisfactorily accomplished by washing the nitro-starch with solutions of alkaline salts ordinarily used for similar purposes in the manufacture of nitro-cotton and nitro-glycerin. For example, sodium carbonate, which is a common wash used in connection with the manufacture of nitro-cotton and nitro-glycerin will attack nitro-starch and consequently has a strong tendency to lessen its stability rather than to increase it. The same is true, so far as I am aware, of all other alkalies of sufficient strength to neutralize the nitro-starch, which have been heretofore proposed or suggested for use as a wash for nitro-starch, or, in fact, any other nitro-explosive. I have discovered, however, that nitro-starch may be successfully stabilized by washing it with a solution of common borax, that reagent having a sufficiently basic character, when properly used, to neutralize the nitro-starch and remove deleterious impurities without the accompanying disadvantage possessed by other alkalies above referred to.

In carrying out my invention the nitro-starch may be prepared by any of the known methods, but preferably by one which will give the product as much inherent stability as possible before the final washing or stabilizing process. I have successfully used as an acid mixture 33 to 36% nitric acid, 63 to 67% sulfuric acid, and 3 to 4% water, adding one weight of the starch to 4 of the acid mixture. The nitrated product is preliminarily washed in any suitable manner, water and weak solution of ammonia being usual washes.

To nitro-starch properly prepared, is added a suitable quantity of a solution of borax. I prefer to use 5 weights of borax solution to 1 of nitro-starch, although I do not limit myself to such a proportion, as satisfactory results can be obtained by varying proportions. I also prefer to use a concentrate solution, such, for example, as a 10% solution, as this has given satisfactory results, but I do not limit myself to any specific strength of solution.

After the borax solution has been added, I am accustomed to agitate the nitro-starch in any suitable manner in order that the nitro-starch may be entirely in suspension in the borax solution. This step I consider desirable because it causes all particles of the nitro-starch to be thoroughly acted upon by the reagent. After thorough agitation the nitro-starch is permitted to settle, and the supernatent liquid drawn off, when the nitro-starch is given a final wash with water, or other suitable agent, to remove the borax and such impurities as have been dissolved thereby, and the nitro-starch is then dried in any customary manner.

I do not desire to limit myself to the specific means set forth for causing a thorough washing of the nitro-starch by the borax solution. The steps which I have given are common laboratory methods, and I have found them satisfactory.

Other borates may be substituted for borax, if desired, with the same result. I prefer to use common commercial borax, however, because of its cheapness.

I claim:—

1. The described process of stabilizing nitro-starch consisting in treating it with a borate solution, and washing.

2. The described process of stabilizing nitro-starch consisting in treating it with a borax solution, and washing.

3. The described process of stabilizing nitro-starch consisting in treating it with a concentrate solution of borax, and washing.

4. The described process of stabilizing nitro-starch consisting in treating it with five times its weight of concentrate borax solution, and washing.

5. The described process of stabilizing nitro-starch consisting in treating it with a 10% solution of borax, and washing.

6. The described process of stabilizing nitro-starch consisting in treating it with a borax solution, agitating, washing and drying.

In testimony whereof, I have signed my name to this specification, in the presence of two subscribing witnesses.

JESSE B. BRAUNSTEIN.

Witnesses:
 M. ELEANOR ROBERTS,
 JOS. H. KLEIN.